Aug. 31, 1943.   W. HASPEL   2,328,144
VEHICLE
Filed June 7, 1940   2 Sheets-Sheet 1

INVENTOR
Wilhelm Haspel
BY
ATTORNEYS

Aug. 31, 1943. W. HASPEL 2,328,144
VEHICLE
Filed June 7, 1940 2 Sheets-Sheet 2
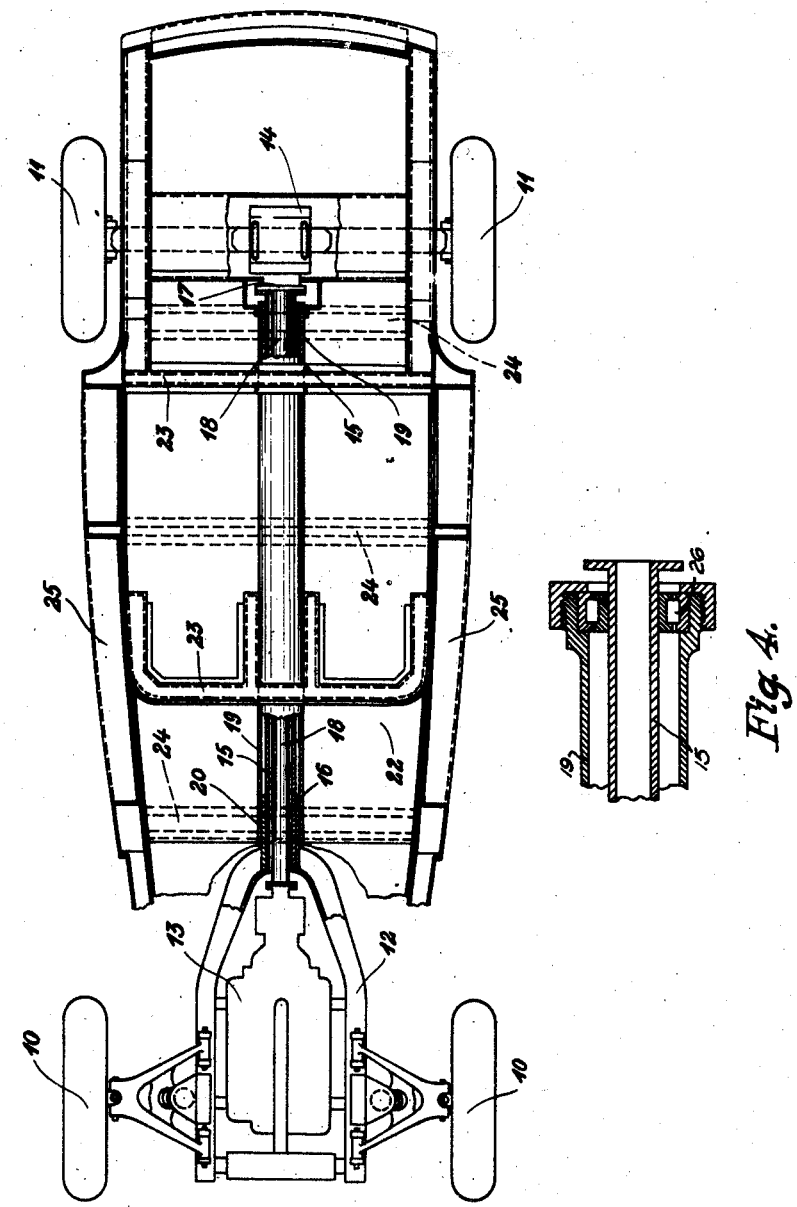

Patented Aug. 31, 1943

2,328,144

UNITED STATES PATENT OFFICE 2,328,144

VEHICLE

Wilhelm Haspel, Stuttgart-Heumaden, Germany; vested in the Alien Property Custodian Application June 7, 1940, Serial No. 339,212
In Germany February 3, 1939

11 Claims. (Cl. 180—70)

The invention refers to a vehicle, particularly a power-driven vehicle with wheels suspended independently of each other, and its object is to provide a suspension of the body free of twisting relatively to the vehicle frame.

As is known, the shocks resulting from the unevenness of the road act particularly unfavorably on the vehicle structure as a whole, of power driven vehicles with independently suspended wheels, because of the high shock acceleration. As the shocks from the road ensue substantially one-sidedly, each time they produce a twisting strain on the vehicle frame or on the entire vehicle. If these one-sided shocks follow each other very quickly, oftentimes there is produced the so-called "shaking" of the body, a symptom of resonance comes forth, this being very troublesome for the passengers of the vehicle on account of the noise connected with it, and besides straining all joints of the body to an undesirable extent.

Accordingly, the invention consists in the arrangement of the body on the vehicle frame in such a manner that it does not take part in the twisting motions of the latter. For this purpose it is rigidly connected to the frame at one end only, or only in one place, in a direction to prevent rotation about a longitudinal axis, and also being yieldingly supported on the frame in the direction of rotation, particularly if the frame consists only of a central longitudinal tube.

In accordance with the above, the frame may be so shaped that it insures the proper relative distance and track of the wheels suspended to it, but at the same time functions so that it yields about its longitudinal axis to twisting forces acting on it. Preferably the frame formed in the shape of a central longitudinal tube will here be shown enclosed by a hollow bearer rigid against torsion, and rigidly connected to the body, forming, as it were the backbone of the car body. With vehicles with a driving unit arranged in the front, the rigid connection is preferably made at the front; with vehicles with a rear driving unit, preferably at the rear end. Besides, the rigid hollow member is supported preferably rotatably on the central longitudinal bearer, for example by means of a journal bearing or a roller bearing. The support of the body on the frame, being yielding in the direction of rotation about a longitudinal axis, may also be effected by means of a layer of yielding material, like rubber. In order to enable the hollow member, being rigid against torsion, to fulfill its task to serve as a backbone for the body, stiffening cross members of the body are preferably provided, forming closed hollow beams together with the bottom of the body, which are connected along a broad surface with the above mentioned hollow bearer and with the lateral longitudinal beams of the body.

In the drawings one type of the invention is illustrated by way of example.

Fig. 3 is a plan view of the vehicle; and

Fig. 4 is a cross-sectional view on an enlarged scale of a modified bearing detail used in connection with the present invention.

Figure 1:
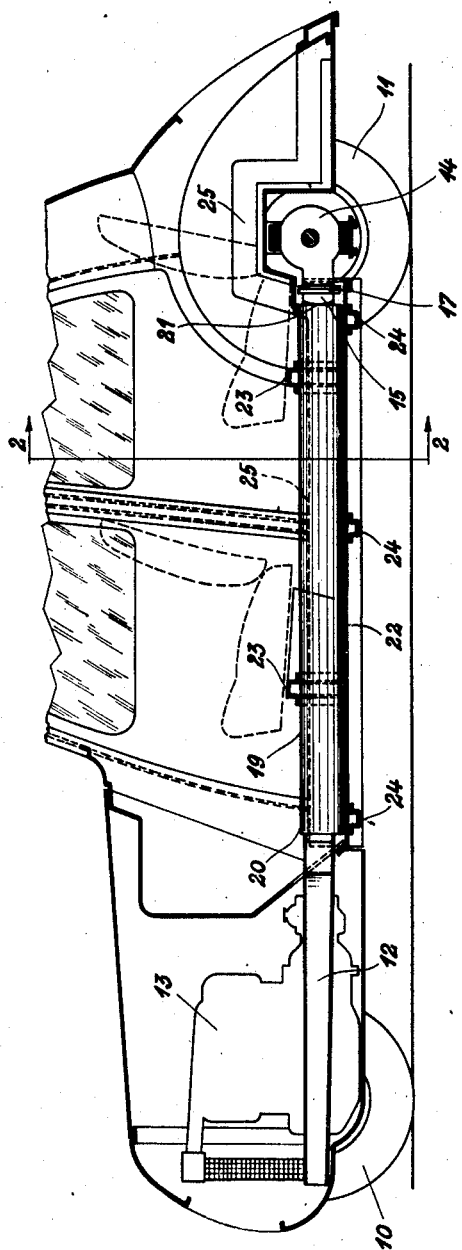
Fig. 1 shows a longitudinal section through a power driven vehicle formed according to the invention.
Figure 2:
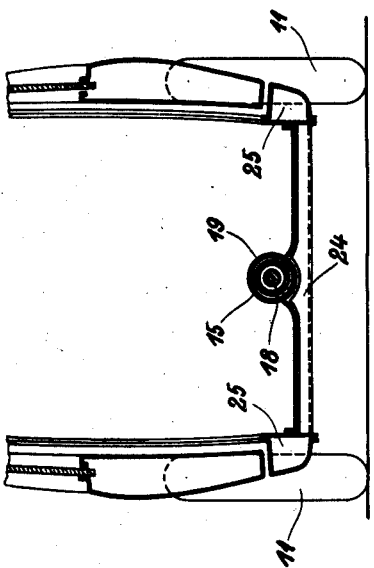
Fig. 2 shows a cross section through the line 2—2 of Fig. 1.

The front wheels 10 as also the rear wheels 11 of the vehicle are suspended in a well known manner, independently of each other onto the vehicle, for instance by means of link parallelograms in connection with spiral- or rod-shaped springs, or transverse plate springs, the front wheels being suspended to a fork-shaped part 12 of the frame which simultaneously carries the driving gear 13, and the rear wheels at the casing 14 for the differential gear of the joint-like subdivided rear axle. The fork-shaped frame part 12 forms the forward extension of a central longitudinal bearer 15 which has, in the present case, the form of a tube and is rigidly connected to the frame part at 16. At the rear end of the central longitudinal bearer 15, the casing 14 for the differential gear of the rear axle is secured to the bearer at 17. Within the central longitudinal bearer the driving shaft 18 is arranged, transferring the output of the driving gear by means of the differential gear onto the rear axle.

The central longitudinal bearer 15 constitutes the only connection between the front and the rear axles. Therefore, in so far as the shocks resulting from the unevenness of the road will not be compensated by the pneumatics of the vehicle wheels or by the springs, in connection with existing shock absorbers, the central longitudinal bearer has to take up these shocks. Above all, one-sided shocks following each other with high frequency must be considered, which are produced for example by rows of pot holes or by certain kinds of pavement. Herewith torsional oscillations are produced in the central longitudinal bearer, which, if they are still increased by resonance, are apt to raise considerable destructive forces. These oscillations produce then, the so called "shaking" of the body, if the body is rigidly connected to the vehicle frame, as generally within the prescribed weight limits it will not be possible to make the central longitudinal bearer or any vehicle frame so stiff, that it will not be induced to join these vibrations.

According to the invention, first the dimensions and the material of the central longitudinal bearer 15 are so selected that it may be strong enough to insure the proper relative distance and track of the vehicle wheels under all circumstances, but that it yields to the torsional oscillations transferred onto it. Of course, care is to be taken that the system comprising front running gear, central longitudinal bearer and rear running gear, does not acquire a period of natural vibration which is in resonance with the shock vibrations transferred under normal running conditions from the road onto the above mentioned system. Such a resonance, however, may always be avoided in practice, as the natural frequency of the system, in consequence of the comparatively long length of the central longitudinal bearer, acting as a torsional rod spring, and in consequence of the comparatively large masses acting at both ends of the bearer, will of itself assume a very low value.

Over the central longitudinal bearer 15 yieldingly twisting in itself and taking only in certain respects the place of the usual rigid vehicle frame, a hollow bearer 19, rigid against torsion, is slid. This bearer is rigidly connected with the central longitudinal bearer only at its front end at 20. The rear end of the hollow bearer 19 is supported at 21, easily turnable on the central longitudinal bearer, for example in a journal bearing, or a roller bearing or even in a rubber bushing inserted between the hollow bearer 19 and the central longitudinal bearer. The latter is secured within the space between the two bearers by means of face pressure or by any other suitable connection so that a support similar to the one known under the terms "silient bloc" or "swing metal" support will be the result. A suitable roller bearing construction is illustrated in Fig. 4, showing a roller bearing 26 intermediate the central longitudinal bearer 15 and its surrounding hollow bearer 19.

The hollow bearer 19 which is rigid against torsion forms in a way a backbone of the body. For this purpose the following arrangements are made: The bottom 22 of the body is welded onto the hollow bearer over its entire length. The stiffening cross members 23, 24 arranged above and below the bottom of the body have a U-shaped cross section and are also welded onto the bottom 22 over its whole length, so that they also form closed hollow bearers together with the bottom. All of the cross bearers are secured onto the central hollow bearer 19 and to the lateral hollow bearers 25 of the body over a broad surface, preferably also by means of welding.

In this manner the body obtains a bottom frame which is very rigid against twisting and transfers all transverse forces acting on it immediately from above onto the central hollow bearer 19 which is rigid against torsion, so that the body in itself cannot be twisted by such forces, but might only be shaken as a whole in a transverse direction. An excessive shaking of the entire body in a transverse direction is, however, prevented by the rigid connection of the hollow bearer 19 with the central longitudinal bearer 15, at 20, as the transverse forces are transferred onto the front wheels 10 and thereby onto the ground through the comparatively rigid fork shaped part 12 of the frame, and through the forward wheel suspension.

On the part of the axles or running gear, no torsional forces can be transferred onto the hollow bearer 19, this being secured to the central longitudinal bearer only at one end. The solid interconnection of both bearers just at their front end is particularly practical in this instance, as the torsional oscillations of the central longitudinal bearer show the smallest deflections in this place on account of the relatively large mass of the driving gear lying immediately in front of it. In the reverse case, with a vehicle with a rear motor it will be of advantage to make the solid connection between the central longitudinal bearer 15 and the hollow bearer 19, being rigid against torsion, at the rear end of same.

Having now particularly described and ascertained the nature of my invention and in what manner the same is to be performed, I declare that what I claim is:

1. In a vehicle having a pair of front wheels and a pair of rear wheels, a central longitudinal bearer forming substantially the vehicle frame, means for the suspension of the front pair of wheels onto the central longitudinal bearer, means for the suspension of the rear pair of wheels onto the central longitudinal bearer, a body, a hollow bearer securely connected to the body, surrounding the central longitudinal bearer and being rigidly connected to it against rotation about the central longitudinal axis of the vehicle only at one end.

2. In a vehicle, the combination according to claim 1, in combination with a driving unit positioned at one end of the vehicle, said hollow bearer being rigidly connected to the central longitudinal bearer only at that end of the vehicle at which the driving unit is positioned.

3. In a vehicle, the combination according to claim 1, in combination with a driving unit positioned at the front end, said hollow bearer being rigidly connected to the central longitudinal bearer only at its front end.

4. In a vehicle, the combination according to claim 1, in which said hollow bearer is rotatably supported on the central longitudinal bearer at that end which is opposite to the one which is rigidly connected to the central longitudinal bearer.

5. In a vehicle, the combination according to claim 1, in combination with a roller bearing rotatably supporting said hollow bearer on the central longitudinal bearer at that end which is opposite to the one which is rigidly connected to the central longitudinal bearer.

6. In a vehicle, the combination according to claim 1, in combination with an intermediate layer of yielding material supporting said hollow bearer on the central longitudinal bearer at that end which is opposite to the one which is rigidly connected to the central longitudinal bearer.

7. In a vehicle, the combination according to claim 1, in which the means for the suspension of the wheels at the central longitudinal bearer are so arranged that the wheels are guided independently of each other.

8. In a vehicle, a vehicle frame, means for the suspension of a pair of front wheels and means for the suspension of a pair of rear wheels onto the vehicle frame, a body rigidly connected to the vehicle frame against rotation about the central longitudinal axis of the vehicle at one point only, the rest of said body being yieldably rotatably supported on said frame about said central longitudinal axis, said vehicle frame being formed as a central longitudinal bearer, and said body comprising a hollow bearer enclosing the central longitudinal bearer and connected with the same at said point, said body having a bottom, stiffening cross members forming together with the bottom of the body closed hollow bearers, and lateral longitudinal hollow bearers combined with the bottom of the body and said stiffening cross members to form a unit which is rigid against twisting.

9. In a vehicle, the combination according to claim 1, in which the central longitudinal bearer ends in a frame fork at that end at which it is rigidly connected to said hollow bearer, in combination a driving motor arranged between the frame fork.

10. In a vehicle, the combination according to claim 1, in combination with a motor mounted at one end of the central longitudinal bearer, an axle gear mounted at the other end of the central longitudinal bearer for driving the pair of wheels at this end of the vehicle, and a driving shaft extending through the central longitudinal bearer, connecting the motor with the axle gear.

11. In a vehicle, a vehicle frame, means for the suspension of a pair of front wheels and means for the suspension of a pair of rear wheels onto the vehicle frame, and a body rigidly connected to the vehicle frame against rotation about the central longitudinal axis of the vehicle at one point only, the rest of said body being yieldably rotatably supported on said frame about a longitudinal axis, said body including a hollow longitudinal bearer by means of the hollow surfaces of which said body is supported on the frame.

WILHELM HASPEL.